United States Patent [19]

Ipri et al.

[11] Patent Number: 4,965,646
[45] Date of Patent: Oct. 23, 1990

[54] THIN FILM TRANSISTOR AND CROSSOVER STRUCTURE FOR LIQUID CRYSTAL DISPLAYS

[75] Inventors: Alfred C. Ipri, Princeton; Roger G. Stewart, Neshanic Station, both of N.J.

[73] Assignee: General Electric Company, Princeton, N.J.

[21] Appl. No.: 260,845

[22] Filed: Oct. 21, 1988

[51] Int. Cl.⁵ .................. H01L 29/78; H01L 27/12
[52] U.S. Cl. ........................................ 357/23.7; 357/4; 357/71; 357/41
[58] Field of Search ............... 357/23.7, 4, 71, 41

[56] References Cited

U.S. PATENT DOCUMENTS

| 4,599,246 | 7/1986 | Harajiri et al. | 427/86 |
| 4,697,331 | 8/1987 | Boulitrop et al. | 357/4 |
| 4,738,749 | 4/1988 | Maurice et al. | 357/4 |

*Primary Examiner*—Jerome Jackson, Jr.
*Attorney, Agent, or Firm*—Tripoli J. S.; D. H. Irlbeck; L. L. Hallacher

[57] ABSTRACT

A three-mask process for fabricating liquid crystal devices enables the simultaneous fabrication of thin film transistors and conductor crossovers, thereby permitting the simultaneous fabrication of drive circuitry on the periphery of the devices.

5 Claims, 3 Drawing Sheets

THIN FILM TRANSISTOR AND CROSSOVER STRUCTURE FOR LIQUID CRYSTAL DISPLAYS

BACKGROUND

This invention relates generally to liquid crystal display devices and particularly to a thin film transistor (TFT) and conductor crossover structure for such devices.

Liquid crystal display devices include an array of liquid crystal elements (pixels) arranged in a matrix of rows and columns. In active matrix display devices, each pixel is associated with a solid state switching device, such as a thin film transistor (TFT). As is known to those skilled in the art, a liquid crystal element is composed of a liquid crystal material arranged between two electrodes. The light transmission capability of the liquid crystal material is changed by voltage biasing the electrodes to change the orientation of the molecules within the liquid crystal material. The liquid crystal elements are arranged in rows and columns, and individual elements are addressed by simultaneously voltage biasing a drive line and a data line which are individually coupled to the electrodes of the elements. The biasing voltage to one of the electrodes of the liquid crystal element is applied through a solid state switching device (TFT) to enable the liquid crystal elements to store a charge for the time required to produce a visual display. Accordingly, the fabrication of a liquid crystal display device includes the fabrication of the TFT's and the connection of the TFT's to the control electrodes of the liquid crystal elements.

Typically in the prior art, in the fabrication of the TFT's for liquid crystal displays various photographic masks are employed whereby different portions of the TFT's, and the liquid crystal electrodes, are formed at various steps in the process. Typically, the number of masks used in fabricating the TFT's is four. However, as is known to those in the art, the yield of devices fabricated using multiple masks is inversely proportional to the number of masks used. Accordingly, it is advantageous to decrease the number of masks used in the formation of the TFT's. In keeping with this goal, it is possible to fabricate the TFT's for liquid crystal display devices utilizing only two masks. The two mask process is advantageous when the drive circuitry used to energize the drive and data lines is fabricated separately from the solid state switching devices of the liquid crystal display. However, it should be appreciated that a substantial cost savings can be realized by simultaneously fabricating the TFT's and the drive circuitry onto the substrate which supports the liquid crystal matrix. The two mask processing has several disadvantages when the drive circuitry is to be so fabricated. Firstly, a parasitic transistor is formed and connects the pixel transistors to the data line, this parasitic transistor can deleteriously affect the on/off characteristics of adjacent TFT's or can cause crosstalk between adjacent data lines. Another disadvantage is the fact that the data lines have a high resistance. Another disadvantage is the lack of an electrical connection between the gate of the TFT and the source or drain lines.

For these reasons there is a need for a method for fabricating thin film transistors on the substrate of a liquid crystal display device which eliminates the above stated disadvantages. The present invention fulfills these needs by the provision of a three mask process which permits the interconnection of the gate and source/drain regions of various transistors. The invention also provides a crossover structure which enables the drive circuitry to be fabricated on the same substrate as the display device. Another advantage is the provision of a dielectric stringer which inhibits the formation of a parasitic resistor between the gate and channel regions of the TFT's.

SUMMARY

A thin film transistor (TFT) and crossover structure for a liquid crystal display device includes a transparent electrode layer supported by a transparent substrate. The transparent electrode layer is configured into pixel electrodes, drive lines and data lines. A doped layer over selected portions of the transparent electrode layer forms source and drain regions for the TFT. An undoped layer over the doped layer forms a channel region between the source and drain regions. A dielectric layer over the undoped layer forms a gate electrode for the TFT. A first conductive layer over selected portions of the dielectric layer makes electrical connections to the pixel electrode, the drive lines and the data lines. A second conductive layer over selected portions of the first conductive layer is in electrical connection with the first conductive layer and with portions of the transparent electrode layer, to form electrode crossovers and to connect the pixel electrode to drive circuitry.

DETAILED DESCRIPTION

FIGS. 1a to 1e sequentially show the three mask process for forming the TFT's and a crossover structure for a liquid crystal display device. FIGS. 1a to 1e appear to be crosshatched; this is not intended. Each layer is shaded differently, and the various layers are similarly shaded in all the figures in an effort to facilitate the visual identification of the various layers. The shading which identifies the various layers is shown in the legend which appears beneath FIG. 1e.

Figure 1A:
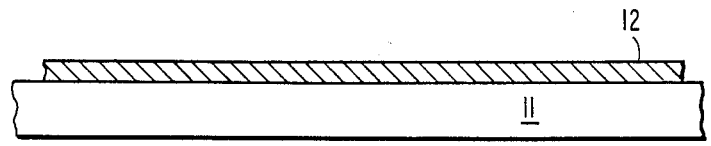
FIGS. 1a to 1e sequentially show the steps of a preferred three mask process for fabricating a preferred embodiment.
Figure 1B:
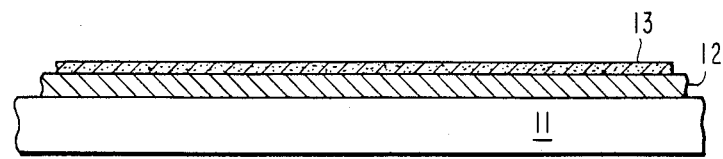
Figure 1C:
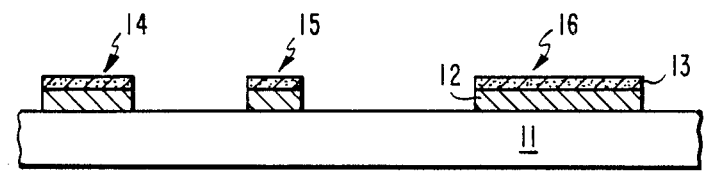
Figure 1D:
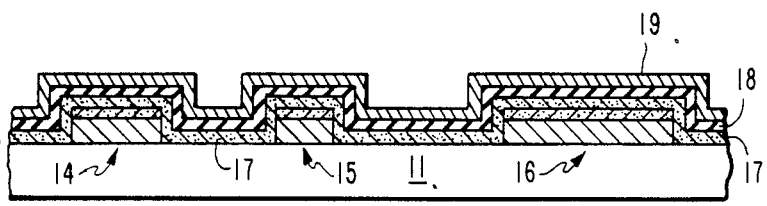
Figure 1E:
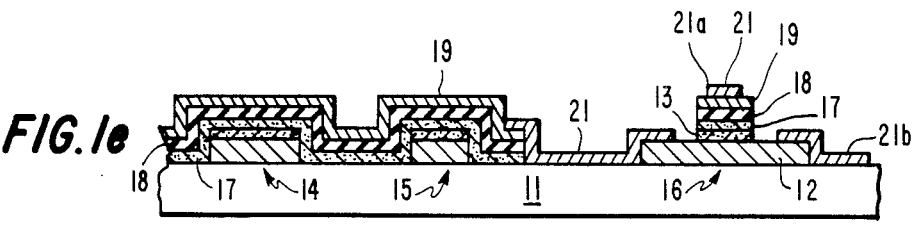

In FIG. 1a, one surface of a transparent substrate 11 is coated with a transparent electrode layer In FIG. 1b, a doped layer 13, which preferably is doped amorphous silicon, is deposited over the transparent electrode layer 12. FIG. 1c shows how selected areas 14, 15 and 16 remain after the first mask is used in a photographic and etching process to remove the portions of the transparent electrode layer 12 and amorphous silicon layer 13 which are not needed to form the device. In FIG. 1d, an undoped layer 17, which preferably is undoped amorphous silicon, is deposited over the entire structure. The undoped layer 17 thus, extends between the portions 14 and 15 and serves as a channel region between the portions 14 and 15, which respectively function as the source and drain regions of a TFT. A dielectric layer 18 is deposited over the entire undoped amorphous silicon layer 17. The dielectric layer 18 serves as the gate insulation layer for the TFT. A first conductive layer 19, which preferably is metal, is deposited over the entire dielectric gate layer 18. Techniques for depositing the layers 17, 18 and 19 onto the substrate 11 are known to those skilled in the art and many techniques are available. The second mask of the three-mask procedure is used to remove selected portions of the layers 13, 17, 18 and 19. In FIG. 1e, a second conductive layer 21, which also preferably is metal, is deposited over selected portions of the device utilizing the third mask of the procedure. As shown in FIG. 1e, the second conductive layer 21 extends between the drain portion 15 of the TFT and the portion of the conductive electrode layer 12 which serves as the control electrode for the liquid crystal device. Some portions, such as 21a, of the second metal layer 21 are insulatively spaced from the conductive electrode layer 12 so that effective crossover structures are available. Additionally, other portions, such as 21b, of the second metal layer 21 contact the conductive electrode layer 12 and thus are available for connecting selected portions of the conductive electrode layer 12 to external drive circuitry, or to output devices.

Figure 2:
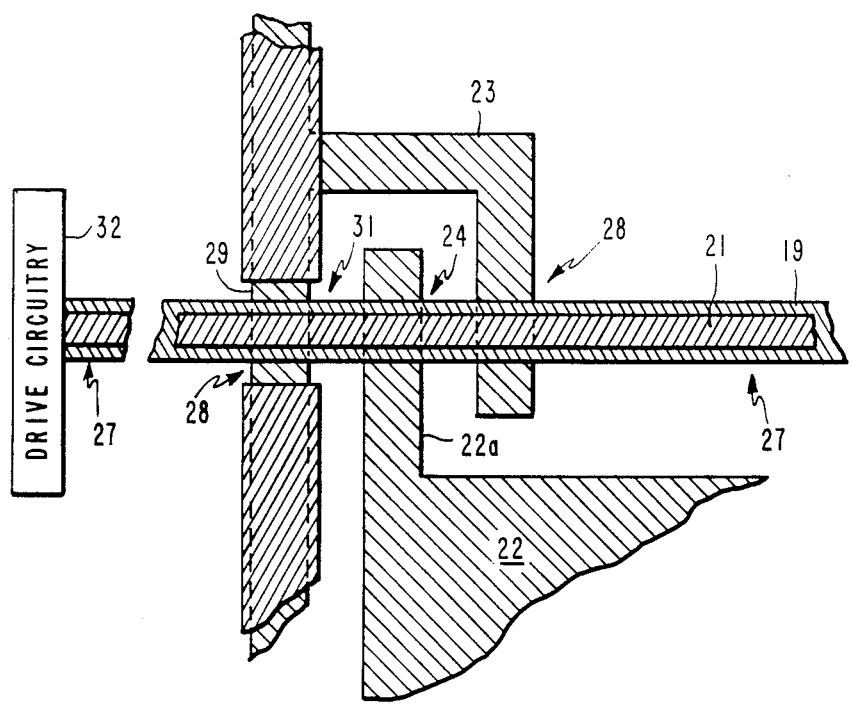
FIG. 2 shows the connection of the TFT's to the control electrode of the liquid crystal element.

FIG. 2 shows a portion of a liquid crystal display device which can be fabricated using the inventive method. Various conductors 22, 22a and 23 are formed from the transparent conductive layer 12. Conductor 22 is the control electrode for a liquid crystal cell. Conductor 22a is an extension of control electrode 22 and connects electrode 22 to the drain 24 of a TFT, which also includes a source 28 and a channel 31. The conductor 23 passes under a conductor 27, which is formed from the first and second metal layers 19 and 21. The widths of layers 19 and 21 are different for illustration purposes, in an actual device they would very nearly be the same width. The conductor 23 is separated from conductor 27 by layers 13, 17 and 18 and thus forms crossover 28. Crossover 28 permits the connection of conductor 27 to drive circuitry 32, which is also fabricated when the TFT and crossover 28 are fabricated. The source 28 of the TFT is formed where another portion 29 of transparent electrode 12 passes under conductor 27. A channel 31 of the TFT connects source 29 and drain 24 of the TFT; in FIGS. 1d and 1e this is illustrated where layer 17 connects source and drain 14 and 15. Because of the ability to form crossovers, such as crossover 28, the data lines and drive lines needed to actuate control electrode 22 can be simultaneously fabricated along with the TFT's, the other conductors and drive circuitry 32. Substantial savings in fabrication cost and a significant increase in yield are thereby realized.

Figure 3:
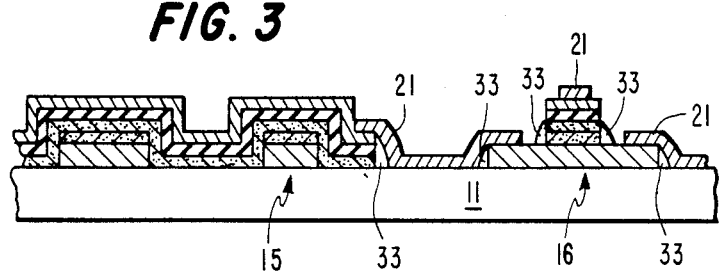
FIG. 3 is another preferred embodiment.

A problem can occur with the process as described with respect to FIGS. 1a through 1e. As shown in FIG. 1e, when the second conductive layer 21 is applied to the device, the metal contacts the edges of the undoped amorphous silicon layer 17 and the dielectric gate layer 18. This can result in a parasitic resistance between the gate and channel regions of the transistor. The resistance of this resistor can be quite high. However, problems can nevertheless arise under certain circumstances. FIG. 3 shows a solution to the problem of parasitic resistance. Dielectric stringers 33 are formed over the exposed amorphous silicon edges to prevent the second metal layer 21 from contacting the edges of the undoped amorphous silicon layer 17. The stringers 33 are formed by depositing a dielectric layer over the entire surface of the device and anisotropically removing the layer from the planar surfaces using a plasma etch system. The dielectric layer is inherently thicker along the edges of the layers than it is over the planar surface of the layer and, therefore, is not completely removed along the edges during the stripping process. The stringer formation therefore requires only a deposition step and an etch step, a photography step utilizing a mask is not required.

Figure 4:
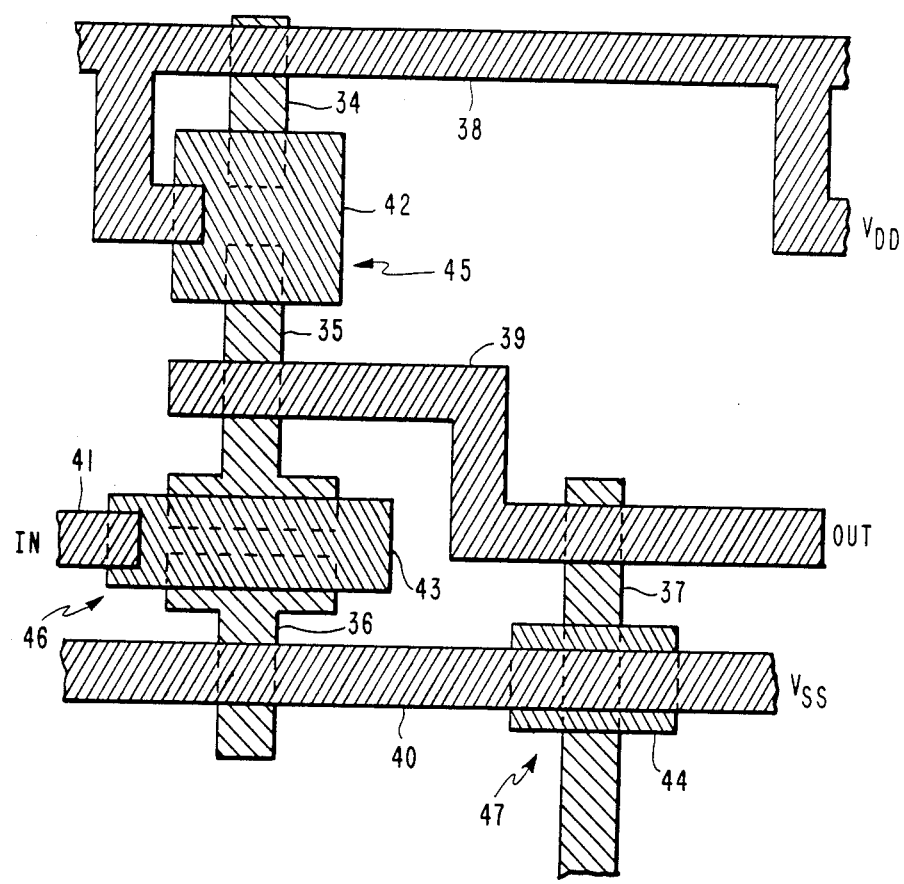
FIG. 4 is an example of peripheral circuitry which can be simultaneously fabricated along with the TFT's of a liquid crystal display device.
Figure 5:
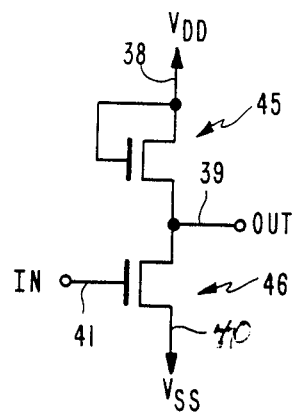
FIG. 5 is the equivalent circuit of the structure of FIG. 4.

FIG. 4 shows an exemplary drive circuit which can be fabricated along with the TFT's and electrodes of a liquid crystal display device utilizing the claimed method. A plurality of transparent conductors 34, 35, 36 and 37 are formed from the conductive electrode layer 12 of FIG. 1a. Another plurality of conductors 38, 39, 40 and 41 are formed from the second conductive layer 21 of FIG. 1e. Another set of conductors 42, 43 and 44 are formed from the first conductive layer 19 of FIGS. 1d and 1e. Conductor 38 is electrically connected to conductors 34 and 42. However, conductors 34 and 35 are partially beneath conductor 42 and are electrically insulated from conductor 42 by layers 17 and 18 of FIG. 1e to thereby for a TFT 45, the drain of which is electrically connected to conductor 34, and the source of which is electrically connected to conductor 35. Conductor 39 is electrically connected to conductors 35 and 37. Conductors 35 and 36 are separated from conductor 43 by layers 17 and 18 of FIG 1e to form another TFT 46, the drain of which is electrically connected to conductor 35, and the source of which is electrically connected to conductor 36. Conductor 40 is electrically connected to conductors 36 and 44, and is separated from conductor 37 by layers 13, 17 and 18 of FIG. 1e to form a crossover structure 47. The circuit of FIG. 4 therefore forms a two transistor inverting circuit the electrical equivalent of which is illustrated in FIG. 5. In FIG. 2 these transistors would be included in drive circuitry 32.

What is claimed is:

1. A thin film transistor and crossover structure for a liquid crystal display device comprising:

a transparent electrode layer supported by a transparent substrate; said transparent electrode layer being configured into pixel electrodes, drive lines and data lines;

a doped layer over selected portions of said transparent electrode layer for forming source and drain regions for said thin film transistor;

an undoped layer over said doped layer for forming a channel region between said source and drain regions;

a dielectric layer over said undoped layer for forming a gate insulation layer for said thin film transistor;

a first conductive layer over selected portions of said dielectric layer for making electrical connections said pixel electrode, said drive lines and said data lines; and a second conductive layer over selected portions of said first conductive layer in electrical connection with said first conductive layer and portions of said transparent electrode layer, for forming electrode crossovers and for connecting said pixel electrode to drive circuitry.

2. The structure of claim 1 further including a dielectric coating along the edges of said undoped layer and said dielectric layer for insulating said edges from said second conductive layer.

3. The structure of claim 2 wherein said first and second conductive layers are metal.

4. The structure of claim 3 wherein said doped layer is doped amorphous silicon.

5. The structure of claim 4 wherein said undoped layer is undoped amorphous silicon.

* * * * *